No. 733,118.

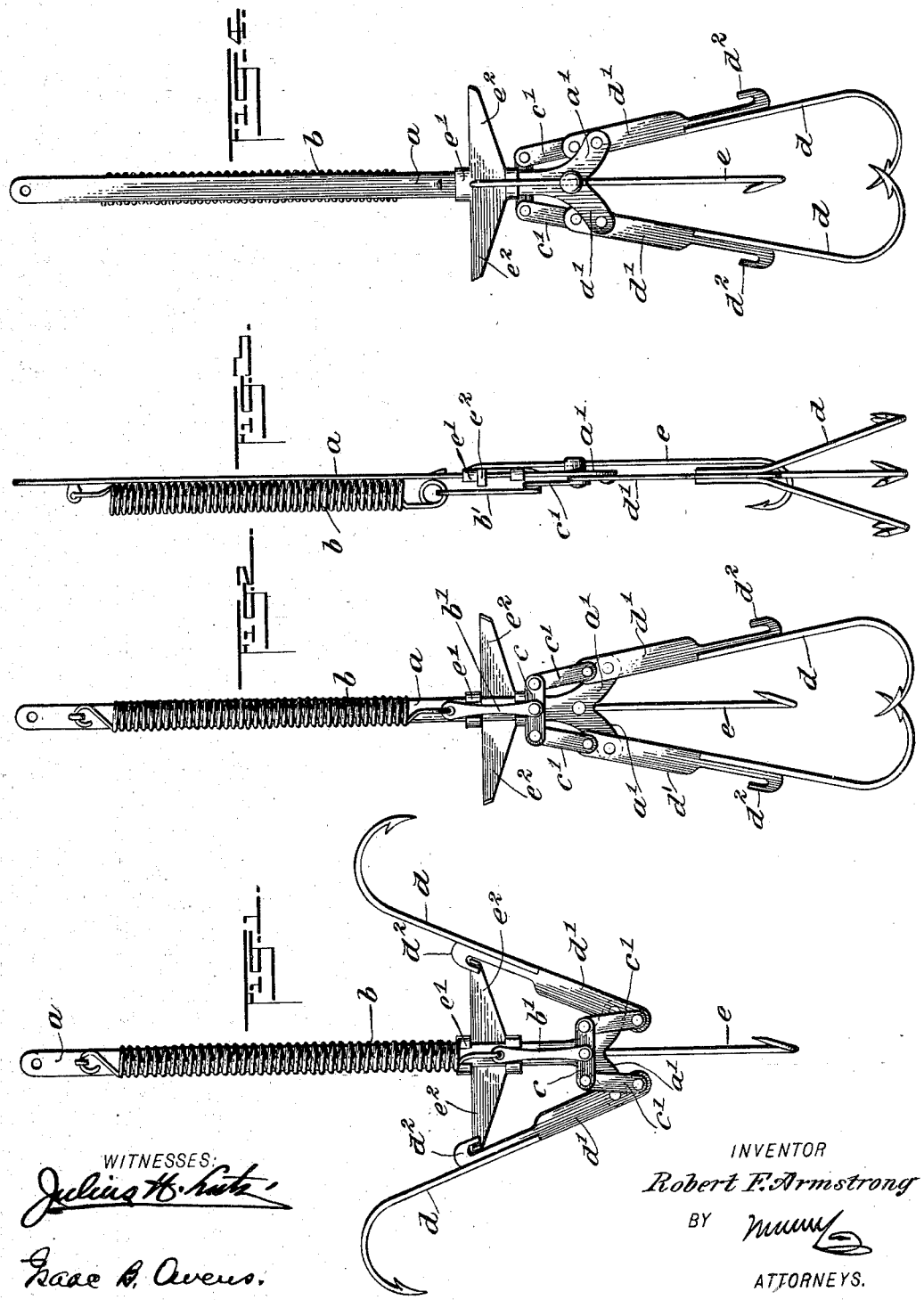

Patented July 7, 1903.

UNITED STATES PATENT OFFICE.

ROBERT FRANCIS ARMSTRONG, OF EFFINGHAM, KANSAS.

FISHING AND TRAPPING DEVICE.

SPECIFICATION forming part of Letters Patent No. 733,118, dated July 7, 1903.

Application filed September 4, 1902. Serial No. 122,064. (No model.)

*To all whom it may concern:*

Be it known that I, ROBERT FRANCIS ARMSTRONG, a citizen of the United States, and a resident of Effingham, in the county of Atchison and State of Kansas, have invented a new and Improved Fishing and Trapping Device, of which the following is a full, clear, and exact description.

This invention relates to a device for catching fish and small animals.

It is particularly adapted for use as a fishing appliance.

It relates to that general class in which a tripping or bait hook is provided in conjunction with a number of impaling or snag hooks, which are spring-actuated and released by the trip-hook to impale the fish when the bait is taken.

It involves certain novel features of construction and arrangement of parts, which will be hereinafter set forth.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a view showing the device set. Fig. 2 is a view showing the device in active position. Fig. 3 is an edge view of the device, and Fig. 4 is a view of the side opposite that shown in Fig. 2.

The device comprises a rigid longitudinally-disposed shank $a$, adapted to have its upper end connected with the line or other means for holding or drawing the device. Near the upper portion of the shank $a$ is fastened the retractile spring $b$, and the lower end of this spring is connected with a link $b'$, which extends downward and carries at its lower end a cross-link $c$. To the ends of the link $c$ are connected links $c'$, and these links in turn are respectively connected to levers $d'$, each of which carries a gang of snag-hooks $d$. The levers $d'$ are fulcrumed intermediate their ends on extensions $a'$ of the shank $a$ and are movable from the position shown in Fig. 1 to that shown in Figs. 2, 3, and 4. Normally the spring $b$ holds the snag-hooks in the latter position.

$e$ indicates the bait or tripping hook, the shank of which is connected to a slide $e'$, mounted on the shank $a$ and having oppositely-projected arms $e^2$. These arms $e^2$ are adapted to engage hooks $d^2$ on the outer ends of the levers $d'$ when said levers are raised to the position shown in Fig. 1 and to hold the levers in this position contrary to the action of the spring $b$.

In using the device the hook $e$ is baited, and the levers $d'$ are thrown back to the position shown in Fig. 1, whereupon the hooks $d^2$ are engaged with the arms $e^2$. When the fish or other victim takes the bait on the hook $e$, said hook is moved slightly downward, carrying with it the slide $e'$ and disengaging the arms $e^2$ from the hooks $d^2$ on the levers $d'$. The spring $b$ then exerts itself, and the hooks $d$ are thrown forcibly downward and impale the victim, thus making its escape impossible.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. The combination of a shank, two impaling-hooks, two means swinging on the shank and carrying the hooks, links connected to said means, a cross-link connected to the first-named links, a spring connected to said cross-link to actuate the hooks, a slide mounted and moving on the shank and having a part coacting with said hook-carrying means, for the purpose specified, and a bait-holding device connected to the slide.

2. The combination of a shank, two levers fulcrumed thereon, impaling-hooks carried by the levers, a link connected to each lever, a cross-link connected to the first-named links, a spring attached to the shank and to the cross-link, a slide mounted on the shank, arms projected out from the shank and removably engaged with the levers for the purpose specified, and a bait-holding device connected to the slide.

3. The combination of a shank having a bifurcated lower end, levers fulcrumed respectively on said bifurcations, impaling-hooks carried by the levers, links connected to the levers, a cross-link joining the first-named links together, a spring in connection with the cross-link and extending upward alongside of the shank and fastened thereto, a slide mounted on the shank and having parts adapted to engage the levers to hold them in set position, and a bait-holding means in connection with the slide and projecting downward from the shank.

4. The combination of a shank having a bifurcated lower end, a lever fulcrumed on each end, each lever having a hook-like portion thereon, an impaling-hook fastened to each lever, a link pivoted to each lever, a cross-link connecting the two first-named links, a spring attached to the cross-link and extended upward alongside of the shank and joined thereto, a slide mounted on the shank, arms attached to the slide and projecting oppositely respectively to engage the said hook-like portions of the lever, and a bait-holding device in connection with the slide.

In testimony whereof I have signed my name to this specification in the presence of two subscribing witnesses.

ROBERT FRANCIS ARMSTRONG.

Witnesses:
CHAS. J. CONLON,
JOHN P. ADAMS.